United States Patent
Taya et al.

(10) Patent No.: US 9,353,278 B2
(45) Date of Patent: May 31, 2016

(54) INK, INK CARTRIDGE, AND IMAGE-RECORDING METHOD

(71) Applicant: CANON KABUSHIKI KAISHA, Tokyo (JP)

(72) Inventors: Akihiro Taya, Yokohama (JP); Masahiro Terada, Hadano (JP); Hidetaka Kawamura, Yokohama (JP); Yohei Masada, Tokyo (JP); Masanobu Ootsuka, Tokyo (JP); Takaharu Aotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/516,339

(22) Filed: Oct. 16, 2014

(65) Prior Publication Data

US 2015/0109384 A1    Apr. 23, 2015

(30) Foreign Application Priority Data

Oct. 21, 2013    (JP) .................................. 2013-218727
Dec. 27, 2013    (JP) .................................. 2013-272033

(51) Int. Cl.

| | | |
|---|---|---|
| C09D 11/38 | (2014.01) |
| C09D 11/102 | (2014.01) |
| C09D 11/322 | (2014.01) |
| C09D 11/324 | (2014.01) |
| B41J 2/01 | (2006.01) |
| B41J 2/21 | (2006.01) |
| C08K 3/04 | (2006.01) |
| C08K 5/06 | (2006.01) |
| C09D 175/04 | (2006.01) |

(52) U.S. Cl.
CPC ............... *C09D 11/38* (2013.01); *B41J 2/2107* (2013.01); *C08K 3/04* (2013.01); *C08K 5/06* (2013.01); *C09D 11/102* (2013.01); *C09D 11/322* (2013.01); *C09D 11/324* (2013.01); *C09D 175/04* (2013.01)

(58) Field of Classification Search
CPC ...... C09D 11/30; C09D 11/32; C09D 11/322; C09D 11/324; C09D 11/326; C09D 11/328; C09D 11/34; C09D 11/36; C09D 11/38; C09D 11/40; C09D 11/50; C09D 11/52; C09D 11/54
See application file for complete search history.

(56) References Cited

U.S. PATENT DOCUMENTS

| | | | | |
|---|---|---|---|---|
| 2009/0162569 A1* | 6/2009 | Morohoshi | ............ | C09D 11/30 427/561 |
| 2010/0196601 A1 | 8/2010 | Goto | | |

(Continued)

FOREIGN PATENT DOCUMENTS

| | | |
|---|---|---|
| EP | 2028242 A1 | 2/2009 |
| JP | 2009019198 A | 1/2009 |

*Primary Examiner* — Manish S Shah
*Assistant Examiner* — Renee I Wilson
(74) *Attorney, Agent, or Firm* — Canon U.S.A., Inc., IP Division

(57) ABSTRACT

Provided is an ink containing a self-dispersible pigment, a polyurethane polymer particle, a surfactant, a water-soluble organic solvent, and water. The surfactant includes a fluorinated surfactant represented by Formula (1) and having an HLB value determined by a Griffin method of 11 or less. The water-soluble organic solvent includes at least one water-soluble organic solvent selected from a specific group, and the total content of the water-soluble organic solvents of the specific group is higher than the total content of the water-soluble organic solvents other than the solvents of the specific group.

8 Claims, 1 Drawing Sheet

(56) References Cited

U.S. PATENT DOCUMENTS

| | | | | |
|---|---|---|---|---|
| 2011/0043578 A1* | 2/2011 | Tojo | ................... | B41M 5/0023 347/102 |
| 2011/0069109 A1* | 3/2011 | Tojo | ................... | 347/21 |
| 2012/0306964 A1* | 12/2012 | Nakajima | ................... | 347/22 |
| 2013/0002776 A1* | 1/2013 | Nagashima et al. | ................... | 347/100 |

* cited by examiner

INK, INK CARTRIDGE, AND IMAGE-RECORDING METHOD

BACKGROUND OF THE INVENTION

1. Field of the Invention

The present invention relates to an ink and relates to an ink cartridge and an image-recording method using the ink.

2. Description of the Related Art

In image-recording methods, inks containing self-dispersible pigments as coloring materials have been used for improving the optical densities of images. Inks containing self-dispersible pigments can form images having relatively high optical densities, but have a problem of low scratch resistance of the images. Accordingly, it has been investigated to improve the scratch resistance of images by further adding a polyurethane polymer particle to an ink containing a self-dispersible pigment (Japanese Patent Laid-Open No. 2009-019198). Japanese Patent Laid-Open No. 2009-019198 describes an ink containing a polyurethane polymer particle in addition to a self-dispersible pigment.

SUMMARY OF THE INVENTION

The ink according to the present invention contains a self-dispersible pigment, a polyurethane polymer particle, a surfactant, a water-soluble organic solvent, and water. The surfactant includes a fluorinated surfactant having an HLB value of 11 or less determined by a Griffin method and represented by Formula (1):

$$R^1(CR^2R^3)_n CH_2 CH_2 (OCH_2 CH_2)_m OH$$

wherein, $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less. The water-soluble organic solvent includes at least one water-soluble organic solvent selected from Group A consisting of glycerin, ethylene glycol, diethylene glycol, polyethylene glycol with a weight-average molecular weight of 10,000 or less, 1,3-propanediol, 1,4-butanediol, and diglycero. The total content of the water-soluble organic solvents of the Group A in the ink is larger than the total content of water-soluble organic solvents other than the water-soluble organic solvents of Group A in the ink.

An aspect of the present invention provides an ink that cab achieve both a high optical density and high scratch resistance of an image. Another aspect of the present invention provides an ink cartridge and an image-recording method using the ink.

Further features of the present invention will become apparent from the following description of exemplary embodiments with reference to the attached drawings.

DESCRIPTION OF THE EMBODIMENTS

Figure 1:
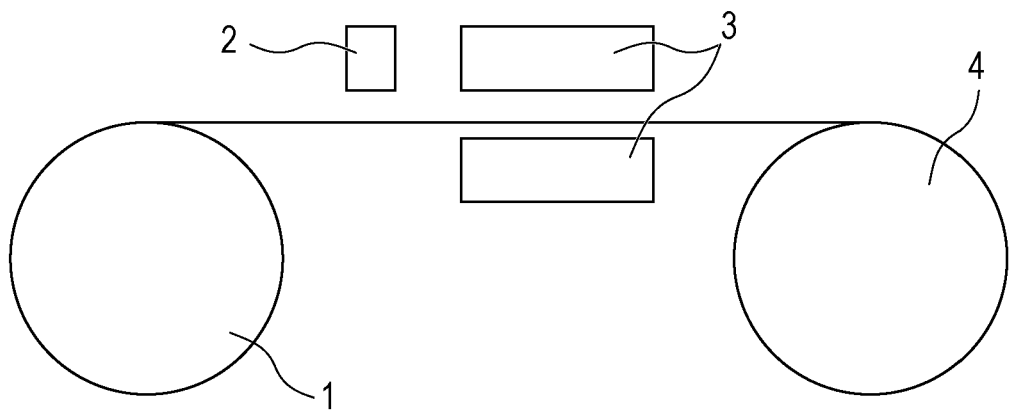
FIG. 1 is a schematic diagram illustrating an example of an image-recording apparatus used for the image-recording method of the present invention.

According to the investigation by the present inventors, however, although the scratch resistance of images formed with the ink described in Japanese Unexamined Patent Application Publication No. 2009-019198 is improved to a certain degree, which has not reached a desired level. In addition, it was revealed that the optical densities of images are decreased by containing a polyurethane polymer particle.

Accordingly, the present invention provides an ink capable of forming images having both a high optical density and high scratch resistance in spite of containing a self-dispersible pigment and a polyurethane polymer particle. The present invention also provides an ink cartridge and an image-recording method using the ink of the present invention.

The present invention will now be described in detail by preferred embodiments.

The present inventors have investigated a method of achieving both a high optical density and high scratch resistance of an image formed with an ink containing a self-dispersible pigment and a polyurethane polymer particle and, as a result, have reached the constitution of the present invention, i.e., a method of using an ink further containing a specific surfactant and a specific water-soluble organic solvent satisfying a specific content relationship. The mechanism providing the effects of the present invention by such a constitution is believed as follows.

The investigation by the present inventors revealed that the optical density and the scratch resistance of an image are improved by containing a specific fluorinated surfactant in the ink, compared to cases containing other surfactants. It is believed that this is based on that the specific fluorinated surfactant has a function of reducing the contact angle of the ink on a recording medium, compared to cases containing other surfactants. It is believed that the use of a specific fluorinated surfactant reduces the contact angle of the ink on a recording medium and allows the ink to readily spread in the horizontal direction on the surface of the recording medium and that as a result, the pigment and the resin particle tend to stay in the vicinity of the surface of the recording medium to enhance the optical density and the scratch resistance of the image. The investigation by the present inventors revealed that not all of fluorinated surfactants have the function described above and that the function is effectively achieved particularly by fluorinated surfactants having a hydrophile-lipophile balance (HLB) value of 11 or less determined by a Griffin method and represented by Formula (1):

$$R^1(CR^2R^3)_n CH_2 CH_2 (OCH_2 CH_2)_m OH$$

wherein, $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less.

However, in some types of recording media, the optical density and the scratch resistance of an image are not sufficiently enhanced by merely using such a fluorinated surfactant. For example, in a case of using a recording medium having high ink absorbency, such as plain paper, pigments and resin particles do not sufficiently stay in the vicinity of the surface of the recording medium, and the resulting image may not have a high optical density and high scratch resistance.

The present inventors have further studied focusing on the types of the water-soluble organic solvents. As a result, it was revealed that an ink containing a specific water-soluble organic solvent in addition to a specific fluorinated surfactant mentioned above allows a pigment and a resin particle to stay in the vicinity of the surface of a recording medium, even if the recording medium has high ink absorbency, such as plain paper. The specific water-soluble organic solvent is at least one water-soluble organic solvent selected from glycerin, ethylene glycol, diethylene glycol, polyethylene glycol with a weight-average molecular weight of 10,000 or less, 1,3-propanediol, 1,4-butanediol, and diglycerol. The present inventors have found from the results of various experiments that the optical density and the scratch resistance of an image are improved by using these water-soluble organic solvent and fluorinated surfactant in combination. The mechanism of the improvements in the optical density and the scratch resistance of an image by combining a specific fluorinated surfactant and a specific water-soluble organic solvent mentioned above is not clear, but the present inventors presume that the mechanism involves that the specific water-soluble organic solvents each have two or more hydroxyl groups in the molecular structure and each have a hydroxyl group on the carbon atom at each end of the molecular structure and that the molecular structure has high symmetry.

The results of further investigation by the present inventors revealed that the effect of improving the optical density and the scratch resistance of an image can be achieved at a high level when the total content of the specific water-soluble organic solvents based on the total mass of the ink is higher than the total content of the water-soluble organic solvents other than the specific water-soluble organic solvents.

As described above, a pigment and a resin particle can stay in the vicinity of the surface of a recording medium, regardless of the type of the recording medium, when an ink containing a self-dispersible pigment and a polyurethane polymer particle further contains the specific fluorinated surfactant and the specific water-soluble organic solvent with a specific content relationship between the specific water-soluble organic solvents and other water-soluble organic solvents. Thus, each constitution synergistically acts on each other to allow the achievement of the effect of the present invention, i.e., a high optical density and high scratch resistance of an image.

[Ink]

The ink of the present invention contains a self-dispersible pigment (hereinafter, also simply referred to as "pigment"), a polyurethane polymer particle, a fluorinated surfactant represented by Formula (1) and having an HLB value of 11 or less, a water-soluble organic solvent (hereinafter, also simply referred to as "surfactant represented by Formula (1)"), and water. Each component that can be used in the ink of the present invention will now be described.

<Self-dispersible Pigment>

In the present invention, the term "self-dispersible pigment" refers to a pigment having at least one hydrophilic group bound to the pigment surface directly or via another atomic group (—R—). Examples of the hydrophilic group include —COOM, —SO$_3$M, —PO$_3$HM, and —PO$_3$M$_2$. In these formulae, "M" can be a hydrogen atom, an alkali metal, ammonium, or organic ammonium. In the present invention, good ejection stability of an ink can be obtained when "M" is an alkali metal such as lithium, sodium, or potassium, compared to the cases of ammonium or organic ammonium. The hydrophilic group in the ink may be in a partially dissociated state or in an entirely dissociated state. Examples of the another atomic group (—R—) include alkylene groups having 1 to 12 carbon atoms, substituted or unsubstituted phenylene groups, and substituted or unsubstituted naphthylene groups.

(Type of Self-dispersible Pigment)

The pigment that is contained in the ink of the present invention may be an inorganic pigment or an organic pigment, and any known pigment that can be used in an ink can be used.

Examples of the self-dispersible inorganic pigment include known inorganic pigments, such as carbon black, having surfaces to which hydrophilic groups are introduced. Examples of the self-dispersible carbon black include CAB-O-JET 200, 300, 352K, and 400 (manufactured by Cabot Corporation).

Examples of the self-dispersible organic pigment include known organic pigments having surfaces to which hydrophilic groups are introduced. Specific types of the pigments are as follows. The cyan pigment can be a copper phthalocyanine pigment, and examples thereof include C.I. Pigment Blue 1, 2, 3, 15, 15:2, 15:3, 15:4, 16, 22, and 60. Examples of self-dispersible cyan pigments include CAB-O-JET 250C, 450C, and 554B (manufactured by Cabot Corporation). The magenta pigment can be a quinacridone pigment, and examples thereof include C.I. Pigment Red 5, 7, 12, 48, 48:1, 57, 112, 122, 123, 146, 168, 184, 202, and 207. Examples of self-dispersible magenta pigments include CAB-O-JET 260M, 265M, and 465M (manufactured by Cabot Corporation). The yellow pigment can be an azo pigment, and examples thereof include C.I. Pigment Yellow 12, 13, 14, 16, 17, 74, 83, 93, 95, 97, 98, 114, 128, 129, 151, and 154. Examples of self-dispersible yellow pigments include CAB-O-JET 270Y, 470Y, and 740Y (manufactured by Cabot Corporation).

The investigation by the present inventors revealed that the physical adsorption of a polyurethane polymer particle to a pigment is high in the case of using an inorganic pigment, compared to the case of using an organic pigment, and that the effect of enhancing the scratch resistance of an image is high in the case of using an inorganic pigment. Among inorganic pigments, in particular, self-dispersible carbon black can be used. This is because that the self-dispersible carbon black has a property of readily causing aggregation of the pigment by, for example, evaporation of an aqueous medium after application of the ink to a recording medium.

(Content of Self-dispersible Pigment)

The content of the self-dispersible pigment in an ink is preferably 0.1% by mass or more and 5.0% by mass or less, more preferably 1.0% by mass or more and 4.0% by mass or less, based on the total mass of the ink. A content of less than 1.0% by mass may not sufficiently improve the optical density of an image, whereas a content of higher than 4.0% by mass may not provide, for example, sufficient sticking resistance.

In addition, the total content of the self-dispersible pigment and the content of the polyurethane polymer particle described below is preferably 10% by mass or less, more preferably 8% by mass or less, based on the total mass of the ink. If the total content is higher than 10% by mass, the ink may not have sufficient ejection stability.

In addition, the mass ratio of the content of the self-dispersible pigment to the content of the polyurethane polymer particle described below, based on the total mass of the ink, is preferably 0.5 or more and 4 or less, more preferably 1 or more and 4 or less, and most preferably 2 or more and 4 or less. If the mass ratio is less than 0.5, the content of the self-dispersible pigment may be too low for sufficiently improving the optical density of an image. If the mass ratio is higher than 4, the content of the polyurethane polymer particle may be too low for sufficiently improving the scratch resistance of an image.

<Polyurethane Polymer Particle>

In the present invention, the term "polyurethane polymer particle" refers to a polyurethane resin in a form having a particle diameter dispersed in a solvent. (Physical properties of polyurethane polymer particle)

In the present invention, 50% cumulative volume average particle diameter ($D_{50}$) of the polyurethane polymer particle is preferably 1 nm or more and 100 nm or less and more preferably 5 nm or more and 50 nm or less. The $D_{50}$ of the polyurethane polymer particle can be measured using a polyurethane polymer particle dispersion diluted 50-fold (volume basis) with pure water with UPA-EX 150 (manufactured by Nikkiso Co., Ltd.) under conditions: SetZero: 30 s, number of measurements: three times, measuring time: 180 sec, and refractive index: 1.5.

The polyurethane polymer particle contained in the ink of the present invention preferably has a weight-average molecular weight (Mw) of more than 5,000 and not more than 150,000, more preferably 8,000 or more and 100,000 or less, in terms of polystyrene measured by gel permeation chromatography (GPC). An Mw of 5,000 or less reduces the strength of the polyurethane polymer particle, which may not sufficiently improve the scratch resistance of an image. An Mw of more than 150,000 may not provide, for example, sufficient storage stability and ejection stability to the ink. The weight-average molecular weight of a resin particle can be determined by measurement using an apparatus: Alliance GPC 2695 (manufactured by Waters), column: a set of four columns in series, Shodex KF-806M (manufactured by Showa Denko K.K.), detector: refractive index (RI) and calculation using PS-1 and PS-2 (manufactured by Polymer Laboratories) as polystyrene standard samples.

The polyurethane polymer particle contained in the ink of the present invention preferably has an acid value of 100 mg KOH/g or less and more preferably 5 mg KOH/g or more and 30 mg KOH/g or less. The acid value of the polyurethane polymer particle can be measured by titration. For example, a resin particle is dissolved in THF, and the acid value of the solution is measured with an automatic potentiometric titrator AT 510 (manufactured by Kyoto Electronics Manufacturing Co., Ltd.) using a potassium hydroxide ethanol titrant.

(Content of Polyurethane Polymer Particle)

In the present invention, the content of the polyurethane polymer particle can be 0.1% by mass or more and 10.0% by mass or less, based on the total mass of the ink. A content of less than 0.1% by mass may not sufficiently improve the scratch resistance of an image, whereas a content of higher than 10.0% by mass may not provide, for example, sufficient ejection stability to the ink.

In addition, the mass ratio of the content of the polyurethane polymer particle to the content of a fluorinated surfactant described below, based on the total mass of the ink, is preferably 0.5 or more and 4.0 or less and more preferably 1.0 or more and 3.0 or less. If the mass ratio is less than 0.5, the content of the polyurethane polymer particle may be too low for sufficiently improving the scratch resistance of an image. If the mass ratio is higher than 4.0, the content of the fluorinated surfactant may be too low for sufficiently improving the optical density and the scratch resistance of an image because of a difficulty in achieving the above-described effect of keeping the resin particle to stay in the vicinity of the surface of a recording medium.

(Method of Producing Polyurethane Polymer Particle)

The polyurethane polymer particle in the present invention may be produced by any known method that is generally used. For example, the polyurethane polymer particle can be produced as follows: An acid group-free polyol is sufficiently stirred and dissolved in an organic solvent such as methyl ethyl ketone, and polyisocyanate and a an acid group-containing diol are added to the solution for a reaction of preparing a urethane prepolymer solution. The resulting urethane prepolymer solution is neutralized, and ion exchanged water is added thereto, followed by emulsification by high-speed stirring with a homomixer. Subsequently, a chain extender is added to the resulting emulsion to perform a chain-elongation reaction.

Materials constituting the polyurethane polymer particle will now be described.

(1) Polyisocyanate

In the present invention, the polyurethane polymer particle can have a unit derived from a polyisocyanate. In the present invention, the term "polyisocyanate" refers to a compound having two or more isocyanate groups. Examples of the polyisocyanate that can be used in the present invention include aliphatic polyisocyanates, alicyclic polyisocyanates, aromatic polyisocyanates, and araliphatic polyisocyanates. The proportion of the unit derived from polyisocyanate in the polyurethane polymer particle can be 10.0% by mass or more and 80.0% by mass or less.

Examples of the aliphatic polyisocyanate include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of the alicyclic polyisocyanate include isophorone diisocyanate, hydrogenated xylylene diisocyanate, dicyclohexylmethane 4,4'-diisocyanate, 1,4-cyclohexane diisocyanate, methylcyclohexylene diisocyanate, and 1,3-bis(isocyanatemethyl)cyclohexane. Examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Examples of the araliphatic polyisocyanate include dialkyldiphenylmethane diisocyanate, tetraalkyldiphenylmethane diisocyanate, and $\alpha,\alpha,\alpha,\alpha$-tetramethylxylylene diisocyanate. These polyisocyanates may be used alone or in combination of two or more thereof, as necessary. In the present invention, among the polyisocyanates mentioned above, at least one selected from isophorone diisocyanate, hexamethylene diisocyanate, and dicyclohexylmethane 4,4'-diisocyanate can be particularly used.

(2) Acid Group-free Polyol

In the present invention, the polyurethane polymer particle can have a unit derived from an acid group-free polyol. The proportion of the acid group-free polyol contained in the polyurethane polymer particle can be 0.1% by mass or more and 80.0% by mass or less.

Examples of the acid group-free polyol include polyester polyols, polyether polyols, and polycarbonate diols. The acid group-free polyol that is used in the present invention can have carbon atoms of 13 or more and 250 or less. The acid group-free polyol can have a number-average molecular weight of 600 or more and 4,000 or less in terms of polystyrene measured by GPC.

Examples of the polyester polyol include esters of acid components and polyalkylene glycols, divalent alcohols, or tri- or more valent alcohols. Examples of the acid component constituting the polyester polyol include aromatic dicarboxylic acids, alicyclic dicarboxylic acids, and aliphatic dicarboxylic acids. Examples of the aromatic dicarboxylic acid include isophthalic acid, terephthalic acid, orthophthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid. Examples of the alicyclic dicarboxylic acid include hydrogenated products of the aromatic dicarboxylic acids mentioned above. Examples of the aliphatic dicarboxylic acid include malonic acid, succinic acid, tartaric acid, oxalic acid, glutaric acid, adipic acid, pimelic acid, suberic acid, azelaic acid, sebacic acid, alkylsuccinic acid, linoleic acid, maleic acid, fumaric acid, mesaconic acid, citraconic acid, and itaconic acid. In addition, reactive derivatives of these acid components, such as acid anhydrides, alkyl esters, and acid halides, can be used as acid components constituting the polyester polyol. The acid components constituting the polyester polyol mentioned above may be one type or two or more types, as necessary. Examples of the polyalkylene glycol include polyethylene glycol, polypropylene glycol, polytetramethylene glycol, and ethylene glycol-propylene glycol copolymers. Examples of the divalent alcohol include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the tri- or more valent alcohol include glycerin, trimethylolpropane, 1,2,5-hexatriol, 1,2,6-hexatriol, and pentaerythritol. These polyester polyols may be used alone or in combination of two or more thereof, as necessary.

Examples of the polyether polyol include polyalkylene glycols and addition polymers of alkylene oxides and divalent alcohols or tri- or more valent alcohols. Examples of the polyalkylene glycol include polyethylene glycol, polypropylene glycol, polytetramethylene glycol, and ethylene glycol-propylene glycol copolymers. Examples of the divalent alcohol include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane.

Examples of the tri- or more valent alcohol include glycerin, trimethylolpropane, 1,2,5-hexatriol, 1,2,6-hexatriol, and pentaerythritol. Examples of the alkylene oxide include ethylene oxide, propylene oxide, butylene oxide, and α-olefin oxide. These polyether polyols may be used alone or in combination of two or more thereof, as necessary.

The polycarbonate diol may be a polycarbonate diol produced by a known method, and examples thereof include those prepared by reacting a carbonate component such as alkylene carbonate, diaryl carbonate, or dialkyl carbonate or phosgene with an aliphatic diol component. These polycarbonate diols may be used alone or in combination of two or more thereof, as necessary.

In the present invention, among the acid group-free polyols mentioned above, the polyether polyols can be particularly used. The use of the polyether polyol provides appropriate flexibility to a resin film to readily improve the scratch resistance of an image. Furthermore, since the polyether polyol has relatively high hydrophilicity, the ink has excellent ejection stability. Among the polyether polyols, polypropylene glycol can be particularly used.

(3) Acid Group-containing Diol

In the present invention, the polyurethane polymer particle can have a unit derived from an acid group-containing diol. In the present invention, the term "acid group-containing diol" refers to a diol containing an acid group such as a carboxyl group, a sulfonate group, or a phosphate group. The acid group-containing diol may be in the form of a salt with an alkali metal such as Li, Na, or K or in the form of a salt with an organic amine such as ammonia or dimethylamine. The acid group-containing diol can be dimethylol propionic acid or dimethylol butanoic acid. These diols may be used alone or in combination of two or more thereof, as necessary. The proportion of the unit derived from the acid group-containing diol in the polyurethane polymer particle can be 5.0% by mass or more and 40.0% by mass or less.

(4) Chain Extender

In the present invention, a chain extender may be used in the production of the polyurethane polymer particle. The chain extender is a compound that reacts with an isocyanate group remaining in the polyisocyanate unit of a urethane prepolymer, without forming a urethane bond. Examples of the chain extender include trimethylolmelamine and its derivatives; dimethylolurea and its derivatives; multivalent amine compounds such as dimethylolethylamine, diethanolmethylamine, dipropanolethylamine, dibutanolmethylamine, ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, and hydrazine; polyamide polyamines; and polyethylene polyimines. Other examples of the chain extender include ethylene glycol, propylene glycol, 1,3-propanediol, 1,3-butanediol, 1,4-butanediol, 1,5-pentanediol, 1,6-hexanediol, neopentylglycol, diethylene glycol, triethylene glycol, tetraethylene glycol, dipropylene glycol, tripropylene glycol, polyethylene glycol, 3-methyl-1,5-pentanediol, 2-butyl-2-ethyl-1,3-propanediol, 1,4-cyclohexanediol, 1,4-cyclohexanedimethanol, hydrogenated bisphenol A, glycerin, trimethylolpropane, and pentaerythritol. These chain extenders may be used alone or in combination of two or more thereof, as necessary.

<Surfactant>

The ink of the present invention contains a surfactant having an HLB value of 11 or less and represented by Formula (1):

$$R^1(CR^2R^3)_n CH_2CH_2(OCH_2CH_2)_m OH$$

wherein, $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less.

As described above, the HLB value of the fluorinated surfactant determined by a Griffin method must be 11 or less. In the present invention, the HLB value can be 6 or more and 11 or less. The HLB value determined by the Griffin method is defined as "20× total formula weight of hydrophilic portion/molecular weight". In Formula (1), the portion of "$CH_2CH_2(OCH_2CH_2)_m OH$" is used as the "hydrophilic portion" in the definition.

Examples of the fluorinated surfactant represented by Formula (1) and having an HLB value of 11 or less include FS-3100, FS-30, FSO, and FSN-100 (manufactured by E.I. du Pont de Nemours and Company), Megafac F-444 (manufactured by DIC Corporation), and DSN403N (manufactured by Daikin Industries, Ltd.).

The content of the surfactant represented by Formula (1) can be 0.1% by mass or more and 5.0% by mass or less based on the total mass of the ink.

In the present invention, the ink may further contain a surfactant different from the surfactant represented by Formula (1). For example, the ink may further contain acetylene glycol or nonionic surfactant in which ethylene oxide is added to acetylene glycol. In such a case, the content of the surfactant other than the surfactant represented by Formula (1) can be 0.1% by mass or less based on the total mass of the ink.

<Water and Water-soluble Organic Solvent>

The ink of the present invention contains water and a water-soluble organic solvent. The water can be deionized water (ion exchanged water). The content of water in the ink can be 50% by mass or more and 90% by mass or less based on the total mass of the ink.

In the present invention, the term "water-soluble organic solvent" refers to "solvent having a solubility in water at 20° C. of 500 g/L or more". The water-soluble organic solvent can be any known solvent that can be used in inks, and examples thereof include alcohols, glycols, alkylene glycols, polyethylene glycols, nitrogen-containing compounds, and sulfur-containing compounds. These water-soluble organic solvents may be used alone or in combination of two or more thereof, as necessary. The content of the water-soluble organic solvent in the ink is preferably 50% by mass or less, more preferably 5% by mass or more and 45% by mass or less, based on the total mass of the ink.

In the present invention, it is required that the ink contains at least one water-soluble organic solvent selected from Group A consisting of glycerin, ethylene glycol, diethylene glycol, polyethylene glycol with a weight-average molecular weight of 10,000 or less, 1,3-propanediol, 1,4-butanediol, and diglycerol and that the total content of the water-soluble organic solvents of Group A is higher than the total content of the water-soluble organic solvents other than the solvents of Group A. Furthermore, the total content of the water-soluble organic solvents of Group A based on the total mass of the ink is preferably at least 3 times, more preferably at least 10 times, higher than the total content of the water-soluble organic solvents other than the solvents of Group A as the mass ratio.

In the present invention, the total content of the water-soluble organic solvents selected from Group A is preferably 50% by mass or less, more preferably 5% by mass or more and 45% by mass or less, and more preferably 10% by mass or more and 40% by mass or less, based on the total mass of the ink.

<Additive>

The ink of the present invention optionally contains various additives such as a surfactant other than that mentioned above, a pH adjuster, a corrosion inhibitor, a preservative, an antifungal agent, an antioxidant, a reducing inhibitor, an evaporation promoter, and a chelating agent.

In particular, the ink can contain at least one additive selected from the following Group B (hereinafter, also referred to as "additive of Group B").

Group B: tetritol, pentitol, hexitol, heptitol, octitol, and polyethylene glycol with a weight-average molecular weight of more than 10,000 and not more than 100,000.

The ink containing an additive of Group B can improve the ejection stability while maintaining the high optical density and scratch resistance.

In Group B, the total content of tetritol, pentitol, hexitol, heptitol, and octitol is preferably 3% by mass or more and 20% by mass or less, more preferably 5% by mass or more and 10% by mass or less, based on the total mass of the ink. In Group B, the content of the polyethylene glycol having a weight-average molecular weight of more than 10,000 and not more than 100,000 is preferably 0.0001% by mass or more and 10% by mass or less, more preferably 0.001% by mass or more and 5% by mass or less, based on the total mass of the ink. The viscosity of the ink can be 2 cP or more and 10 cP or less.

[Ink Cartridge]

The ink cartridge of the present invention includes an ink-accommodating unit for containing an ink. The ink-accommodating unit contains the ink of the present invention described above. The ink cartridge has, for example, a structure in which the ink-accommodating unit is composed of an ink-accommodating chamber for containing an ink liquid and a negative pressure generating member-accommodating chamber for containing a negative pressure generating member that retains an ink therein by means of a negative pressure. Alternatively, the ink cartridge may include an ink accommodating unit having a structure in which the accommodating amount is wholly retained by the negative pressure generating member, without the ink-accommodating chamber for containing an ink liquid. Furthermore, the ink cartridge may be constituted so as to have an ink-accommodating unit and a recording head.

[Image-recording Method]

The image-recording method of the present invention includes an ink application step of applying the above-described ink to a recording medium and can further include a conveying step of conveying the recording medium and a heating step of heating the recording medium provided with the ink.

FIG. 1 is a schematic diagram illustrating an example of an image-recording apparatus used for the image-recording method of the present invention. In the image-recording apparatus shown in FIG. 1, recording is performed on a recording medium stored in a roll form and to be wound again into a roll form. The apparatus includes a recording medium feeding unit 1 for holding the recording medium in a roll form and supplying it, an ink applying unit 2 for applying an ink to the recording medium, a heating unit 3 for heating the recording medium, and a recording medium collecting unit 4 for winding the recording medium on which an image has been recorded. The recording medium is conveyed by a conveying means, such as a roller pair or a belt, along the recording medium conveying passage indicated by a solid line in the drawing and is subjected to the treatment at each unit mentioned above. The recording medium wound into a roll form by the recording medium collecting unit 4 may be supplied to, for example, another apparatus and may be cut into a desired size or subjected to treatment such as bookbinding.

In the present invention, the conveying speed of the recording medium in the conveying step of conveying a recording medium is preferably 50 m/min or more and more preferably 100 m/min or more.

In the present invention, a tension can be applied to the recording medium during the conveyance. That is, the image recording apparatus can have a tension applying means for generating a tension. Specifically, the conveying mechanism between the recording medium feeding unit 1 and the recording medium collecting unit 4 shown in FIG. 1 may be provided with, for example, a tension applying unit for causing a tension in the recording medium and a tension controlling unit for controlling the tension of the recording medium. The application of a tension to the recording medium inhibits the fibers of the recording medium from swelling by water in an ink. The swelling of the fibers of a recording medium increases the voids between fibers to increase the permeation rate of an ink. An increase in the permeation rate of an ink allows the ink to readily permeate deeply in the direction perpendicular to the surface of the recording medium, which may cause an insufficient optical density of an image. As described above, the application of a tension to a recording medium inhibits the fibers of the recording medium from swelling by the water in an ink and can inhibit the reduction in the optical density of an image due to an increase in the permeation rate of the ink.

The tension applied to the recording medium can be 20 N/m or more. A tension of 20 N/m can efficiently inhibit the fibers of a recording medium from swelling by water in an ink. Furthermore, the tension applied to the recording medium is more preferably 30 N/m or more and most preferably 40 N/m or more and 100 N/m or less.

The ink application step and the heating step will now be described.

(1) Ink Application Step

In the present invention, in the ink application step, an ink is applied to a recording medium. The ink can be applied to a recording medium by an ink jet system. That is, the image-recording method of the present invention can be an ink jet recording method. The ink jet system may be a thermal ink jet system for ejecting an ink from ejection ports of a recording head by applying thermal energy to the ink or a piezoelectric ink jet system for ejecting an ink from ejection ports of a recording head with piezoelectric devices.

The recording head may be a serial type in which recording is performed by scanning the recording head in the direction intersecting the conveying direction of the recording medium or a full-line type in which a plurality of nozzles are arrayed in a range covering an maximum width assumed to be used of a recording medium. From the viewpoint of recording an image at a higher speed, the recording head can be a full-line type ink jet recording head. In the full-line type ink jet recording head, the nozzle row can be in the direction perpendicular to the conveying direction of the recording medium. The full-line type ink jet recording head can be provided for each of different color inks, and the plurality of the recording heads can be arrayed in parallel along the conveying direction.

(2) Heating Step

In the heating step of the present invention, heating can be performed such that the surface temperature of the recording medium provided with an ink is 70° C. or more. In the present invention, the "surface temperature of a recording medium provided with an ink" refers to the temperature of the surface of a recording medium at the position when the recording medium was conveyed for 0.5 seconds after the application of an ink. Specifically, when the conveying speed of a recording medium is V (m/min), the surface temperature in the ink recorded area X of the recording medium is measured at the position, along the conveying direction of the recording medium, of "V×0.5/60 (m)" from the position at which the ink has been applied (in full-line type ink jet recording head, a position directly under the recording head). In examples of the present invention, the temperature of the surface of a recording medium was measured with a non-contact infrared thermometer digital radiation thermometer FT-H20 (manufactured by Keyence Corporation) from a position of 10 cm apart from the surface of the recording medium approximately in the perpendicular direction.

In the present invention, the surface temperature of a recording medium provided with an ink can be 80° C. or more. From the viewpoint of preventing the recording medium from deformed by heat, the surface temperature can be 140° C. or less. The heating of a recording medium can be performed by, for example, heating the recording medium with a heater from the front surface side (the side to which an ink is applied) of the recording medium and/or from the back surface side.

In the present invention, the heating in the heating step may be continuously performed from before the application of an ink to after the application of the ink. In the present invention, the recording medium before the application of an ink is not heated or, even if heated, the surface temperature of the recording medium is preferably less than 70° C., more preferably 60° C. or less, and most preferably 40° C. or less.

In the heating step, the recording medium may be pressurized with, for example, a pressure roller during the heating of the recording medium. The pressurization can improve the fixing of an image. The recording medium may be applied with a pressure during the whole or a part of the period of the heating step. The pressure may be applied by a multistage process. The method may further include a pressure applying step after the heating step.

<Recording Medium>

In the image-recording method of the present invention, the recording medium to which an ink is applied may be any recording medium that is usually used. Examples of the recording medium include recording media having permeability such as plain paper and glossy paper; recording media having low permeability such as printing sheets; and recording media having impermeability such as glass, plastics, and films. In particular, a recording medium having high permeability to water, an absorption coefficient Ka of 0.3 mL/m²·ms$^{1/2}$ or more, can be used.

Figure 2:
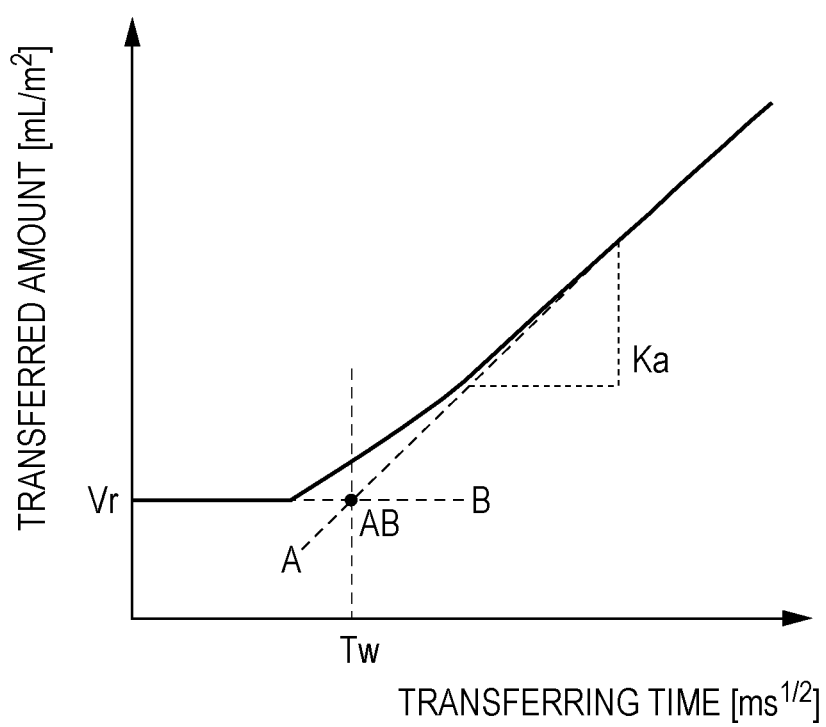
FIG. 2 is a graph showing an example of an absorption curve for explaining the absorption coefficient Ka of a recording medium.

In the present invention, the absorption coefficient Ka of a recording medium is measured by a Bristow method described in "Test Method for Liquid Absorption of Paper and Paperboard" of JAPAN TAPPI paper and pulp test method No. 51. Since the Bristow method is described in many commercially available books, the detailed description thereof is omitted. An example of absorption curve defined by a wetting time Tw, an absorption coefficient Ka (mL/m²·ms$^{1/2}$), and a roughness index Vr (mL/m²) is shown in FIG. 2. The absorption curve shown in FIG. 2 is based on a permeation model in which a liquid comes into contact with a recording medium and then starts permeation into the inside of the recording medium after a lapse of the wetting time Tw. The inclination of the straight line after the wetting time Tw is the absorption coefficient Ka. This absorption coefficient Ka corresponds to the permeation rate of a liquid into the inside of a recording medium. The wetting time Tw is determined, as shown in FIG. 2, as the time until an intersection point AB of an approximation straight line A by a least squares method for calculating the absorption coefficient Ka and a straight line B defined by the transferred amount V of a liquid and the roughness index Vr as V=Vr. In the present invention, water of 25° C. was used as the liquid permeating into the recording medium. That is, the value Ka in the present invention is the absorption coefficient for water at 25° C.

The recording medium that is used in the ink jet recording method of the present invention may be cut into a desired size in advance or in a roll form to be cut into a desired size after the image formation. As described above, it is easy to apply a tension to a recording medium in a roll form. Accordingly, a recording medium in a roll form can be readily used.

EXAMPLES

The present invention will now be described in more detail by examples and comparative examples, but the present invention is not limited to the following examples, within the scope of the present invention. In the following examples, the term "part(s)" is on a mass basis unless otherwise specified.

[Preparation of Ink]

Raw materials were mixed such that the contents (unit: % by mass) were as shown in Tables 1 to 5, and the mixtures were sufficiently stirred. Each of the resulting dispersions was filtered through a glass filter AP20 (manufactured by Millipore Corporation) to prepare each ink.

The pigment used was self-dispersible carbon black, CAB-O-JET 400 (manufactured by Cabot Corporation); and the polyurethane polymer particle used was a polyurethane polymer particle dispersion, Super Flex 840 (manufactured by Daiichi Kogyo Co., Ltd.). The contents (% by mass) of the pigment and the polyurethane polymer particle shown in the following tables are solid contents (% by mass) of the pigment and the polyurethane polymer particle contained in each ink. The surfactant that is represented by Formula (1) is shown as "Formula (1)", and the surfactant that is not represented by Formula (1) is shown as "Other than Formula (1)". In each table, the water-soluble organic solvent that is selected from the following Group A is shown as "Group A", and the water-soluble organic solvent that is not included in Group A is shown as "Other than Group A". Similarly, the additive that is selected from the following Group B is shown as "Group B", and the additive that is not included in Group B is shown as "Other than Group B".

Group A: glycerin, ethylene glycol, diethylene glycol, polyethylene glycol with a weight-average molecular weight of 10,000 or less, 1,3-propanediol, 1,4-butanediol, and diglycerol.

Group B: tetritol, pentitol, hexitol, heptitol, octitol, and polyethylene glycol with a weight-average molecular weight of more than 10,000 and not more than 100,000.

The abbreviations of surfactants shown in the tables are as follows.

<Surfactant>
(1) Fluorinated Surfactant Represented by Formula (1)
(1-1) Fluorinated Surfactant Represented by Formula (1) and Having an HLB Value of 11 or Less F-444: Megafac F-444 (manufactured by DIC Corporation) [HLB value: 8.5]

FSO: Zonyl FSO (manufactured by E.I. du Pont de Nemours and Company) [HLB value: 9.5]

FS-3100: Capstone FS-3100 (manufactured by E.I. du Pont de Nemours and Company) [HLB value: 9.8]

DSN403N: Unidyne DSN-403N (manufactured by Daikin Industries, Ltd.) [HLB value: 10.0]

FS-30: Capstone FS-30 (manufactured by E.I. du Pont de Nemours and Company) [HLB value: 11.0]

(1-2) Fluorinated Surfactant Represented by Formula (1) and Having an HLB Value of Higher than 11

S-242: Surflon S-242 (manufactured by AGC Seimi Chemical Co., Ltd.) [HLB value: 12.0]

S-243: Surflon S-243 (manufactured by AGC Seimi Chemical Co., Ltd.) [HLB value: 15.0]

(2) Surfactant other than Formula (1)
(2-1) Fluorinated Surfactant Other than Formula (1)

Ftergent 250: Ftergent 250 (manufactured by Neos Company Limited) [HLB value: 10.4]

(2-2) Surfactant Other than Fluorinated Surfactant

AE100: acetylene glycol-based surfactant, Acetylenol E100 (manufactured by Kawaken Fine Chemicals Co., Ltd.) [HLB value: 16.3]

TABLE 1

Ink preparation conditions

| | | | | Ink 1 | Ink 2 | Ink 3 | Ink 4 | Ink 5 | Ink 6 | Ink 7 | Ink 8 | Ink 9 | Ink 10 | Ink 11 | Ink 12 | Ink 13 |
|---|---|---|---|---|---|---|---|---|---|---|---|---|---|---|---|---|
| | Pigment (solid content) | | | 4.0 | 4.0 | 4.0 | 4.0 | 4.0 | 4.0 | 4.0 | 4.0 | 4.0 | 4.0 | 4.0 | 4.0 | 4.0 |
| | Polyurethane resin microparticle (solid content) | | | 1.0 | 1.0 | 1.0 | 1.0 | 1.0 | 1.0 | 1.0 | 1.0 | 1.0 | 1.0 | 1.0 | 1.0 | 1.0 |
| Surfactant | Formula (1) | F-444 | HLB value: 8.5 | 1.0 | 1.0 | 1.0 | 1.0 | 1.0 | 1.0 | 0 | 0 | 0 | 0 | 0.5 | 0.5 | 1.0 |
| | | FSO | HLB value: 9.5 | 0 | 0 | 0 | 0 | 0 | 0 | 1.0 | 0 | 0 | 0 | 0 | 0.5 | 0 |
| | | FS-3100 | HLB value: 9.8 | 0 | 0 | 0 | 0 | 0 | 0 | 0 | 1.0 | 0 | 0 | 0 | 0 | 0 |
| | | DSN403N | HLB value: 10.0 | 0 | 0 | 0 | 0 | 0 | 0 | 0 | 0 | 1.0 | 0 | 0 | 0 | 0 |
| | | FS-30 | HLB value: 11.0 | 0 | 0 | 0 | 0 | 0 | 0 | 0 | 0 | 0 | 1.0 | 0.5 | 0 | 0 |
| Water-soluble organic solvent | Group A | Glycerin | | 20.0 | 0 | 0 | 0 | 0 | 0 | 20.0 | 20.0 | 20.0 | 20.0 | 5.0 | 5.0 | 0 |
| | | Ethylene glycol | | 0 | 20.0 | 0 | 0 | 0 | 0 | 0 | 0 | 0 | 0 | 5.0 | 0 | 0 |
| | | Diethylene glycol | | 0 | 0 | 20.0 | 0 | 0 | 0 | 0 | 0 | 0 | 0 | 5.0 | 0 | 5.0 |
| | | Polyethylene glycol (molecular weight: 1,000) | | 0 | 0 | 0 | 20.0 | 0 | 0 | 0 | 0 | 0 | 0 | 0 | 0 | 5.0 |
| | | 1,3-Propanediol | | 0 | 0 | 0 | 0 | 20.0 | 0 | 0 | 0 | 0 | 0 | 0 | 5.0 | 0 |
| | | 1,4-Butanediol | | 0 | 0 | 0 | 0 | 0 | 20.0 | 0 | 0 | 0 | 0 | 0 | 5.0 | 5.0 |
| | Other than Group A | 2-Methyl-1,3-propanediol | | 0 | 0 | 0 | 0 | 0 | 0 | 0 | 0 | 0 | 0 | 5.0 | 0 | 0 |
| | | N-Methyl-2-pyrrolidone | | 0 | 0 | 0 | 0 | 0 | 0 | 0 | 0 | 0 | 0 | 0 | 0 | 5.0 |
| | | Trimethylolpropane | | 0 | 0 | 0 | 0 | 0 | 0 | 0 | 0 | 0 | 0 | 0 | 5.0 | 0 |
| | Ion-exchanged water | | | 74.0 | 74.0 | 74.0 | 74.0 | 74.0 | 74.0 | 74.0 | 74.0 | 74.0 | 74.0 | 74.0 | 74.0 | 74.0 |
| | Content of self-dispersible pigment/Content of PU resin particle (times) | | | 4.0 | 4.0 | 4.0 | 4.0 | 4.0 | 4.0 | 4.0 | 4.0 | 4.0 | 4.0 | 4.0 | 4.0 | 4.0 |
| | Amount of water-soluble organic solvent of Group A/Amount of water-soluble organic solvent other than Group A (times) | | | — | — | — | — | — | — | — | — | — | — | 3.0 | 3.0 | 3.0 |

TABLE 2

Ink preparation conditions

| | | | | Ink 14 | Ink 15 | Ink 16 | Ink 17 | Ink 18 | Ink 19 | Ink 20 | Ink 21 | Ink 22 | Ink 23 | Ink 24 |
|---|---|---|---|---|---|---|---|---|---|---|---|---|---|---|
| | Pigment (solid content) | | | 4.0 | 4.0 | 4.0 | 4.0 | 4.0 | 5.0 | 4.0 | 3.0 | 4.0 | 5.0 | 6.0 |
| | Polyurethane resin microparticle (solid content) | | | 1.0 | 1.0 | 1.0 | 1.0 | 1.0 | 1.0 | 0.8 | 7.5 | 8.0 | 5.0 | 6.0 |
| Surfactant | Formula (1) | F-444 | HLB value: 8.5 | 0 | 0 | 0 | 1.0 | 1.0 | 1.0 | 1.0 | 1.0 | 1.0 | 1.0 | 1.0 |
| | | DSN403N | HLB value: 10.0 | 1.0 | 0 | 0 | 0 | 0 | 0 | 0 | 0 | 0 | 0 | 0 |
| | | FS-30 | HLB value: 11.0 | 0 | 1.0 | 1.0 | 0 | 0 | 0 | 0 | 0 | 0 | 0 | 0 |
| | Other than Formula (1) | AE100 | HLB value: 16.3 | 0 | 0 | 0 | 0.1 | 0.2 | 0 | 0 | 0 | 0 | 0 | 0 |
| Water-soluble organic solvent | Group A | Glycerin | | 10.0 | 15.0 | 10.0 | 20.0 | 20.0 | 20.0 | 20.0 | 20.0 | 20.0 | 20.0 | 20.0 |
| | | Diethylene glycol | | 5.0 | 0 | 0 | 0 | 0 | 0 | 0 | 0 | 0 | 0 | 0 |
| | Other than Group A | 2-Methyl-1,3-propanediol | | 5.0 | 5.0 | 5.0 | 0 | 0 | 0 | 0 | 0 | 0 | 0 | 0 |
| | Ion-exchanged water | | | 74.0 | 74.0 | 79.0 | 73.9 | 73.8 | 73.0 | 74.2 | 68.5 | 67.0 | 69.0 | 67.0 |
| | Content of self-dispersible pigment/Content of PU resin particle (times) | | | 4.0 | 4.0 | 4.0 | 4.0 | 4.0 | 5.0 | 5.0 | 0.4 | 0.5 | 1.0 | 1.0 |
| | Amount of water-soluble organic solvent of Group A/Amount of water-soluble organic solvent other than Group A (times) | | | 3.0 | 3.0 | 2.0 | — | — | — | — | — | — | — | — |

TABLE 3

Ink preparation conditions

| | | | | Ink 25 | Ink 26 | Ink 27 | Ink 28 | Ink 29 | Ink 30 | Ink 31 | Ink 32 | Ink 33 | Ink 34 | Ink 35 | Ink 36 | Ink 37 |
|---|---|---|---|---|---|---|---|---|---|---|---|---|---|---|---|---|
| | Pigment (solid content) | | | 4.0 | 4.0 | 4.0 | 4.0 | 4.0 | 4.0 | 4.0 | 4.0 | 4.0 | 4.0 | 4.0 | 4.0 | 4.0 |
| | Polyurethane resin microparticle (solid content) | | | 1.0 | 1.0 | 1.0 | 1.0 | 1.0 | 1.0 | 1.0 | 1.0 | 1.0 | 1.0 | 1.0 | 1.0 | 1.0 |
| Surfactant | Formula (1) | F-444 | HLB value: 8.5 | 1.0 | 1.0 | 1.0 | 1.0 | 1.0 | 1.0 | 1.0 | 1.0 | 1.0 | 1.0 | 1.0 | 1.0 | 1.0 |
| Water-soluble organic solvent | Group A | Glycerin | | 20.0 | 20.0 | 20.0 | 20.0 | 20.0 | 20.0 | 20.0 | 20.0 | 20.0 | 20.0 | 20.0 | 5.0 | 10.0 |
| | Other than Group A | 2-Methyl-1,3-propanediol | | 0 | 0 | 0 | 0 | 0 | 0 | 0 | 0 | 0 | 0 | 0 | 15.0 | 10.0 |
| Additive | Group B | Tetritol | | 7.0 | 0 | 0 | 0 | 0 | 0 | 0 | 0 | 0 | 0 | 0 | 0 | 0 |
| | | Pentitol | | 0 | 7.0 | 0 | 0 | 0 | 0 | 0 | 0 | 0 | 0 | 0 | 0 | 0 |
| | | Hexitol | | 0 | 0 | 7.0 | 0 | 0 | 0 | 0 | 0 | 0 | 0 | 0 | 0 | 0 |
| | | Heptitol | | 0 | 0 | 0 | 7.0 | 0 | 0 | 0 | 0 | 0 | 0 | 0 | 0 | 0 |
| | | Octitol | | 0 | 0 | 0 | 0 | 7.0 | 0 | 0 | 0 | 0 | 0 | 0 | 0 | 0 |
| | | Polyethylene glycol (molecular weight: 20,000) | | 0 | 0 | 0 | 0 | 0 | 1.0 | 0 | 0 | 0 | 0 | 0 | 0 | 0 |
| | Other than Group B | Urea | | 0 | 0 | 0 | 0 | 0 | 0 | 7.0 | 0 | 0 | 0 | 0 | 0 | 0 |
| | | N-Methylmorpholine N-oxide | | 0 | 0 | 0 | 0 | 0 | 0 | 0 | 7.0 | 0 | 0 | 0 | 0 | 0 |
| | | Xanthan gum | | 0 | 0 | 0 | 0 | 0 | 0 | 0 | 0 | 0.01 | 0 | 0 | 0 | 0 |
| | | Sodium alginate | | 0 | 0 | 0 | 0 | 0 | 0 | 0 | 0 | 0 | 0.01 | 0 | 0 | 0 |
| | | Polyvinyl alcohol | | 0 | 0 | 0 | 0 | 0 | 0 | 0 | 0 | 0 | 0 | 0.01 | 0 | 0 |
| | Ion-exchanged water | | | 67.0 | 67.0 | 67.0 | 67.0 | 67.0 | 73.0 | 67.0 | 67.0 | 74.0 | 74.0 | 74.0 | 74.0 | 74.0 |
| | Content of self-dispersible pigment/Content of PU resin particle (times) | | | 4.0 | 4.0 | 4.0 | 4.0 | 4.0 | 4.0 | 4.0 | 4.0 | 4.0 | 4.0 | 4.0 | 4.0 | 4.0 |
| | Amount of water-soluble organic solvent of Group A/Amount of water-soluble organic solvent other than Group A (times) | | | — | — | — | — | — | — | — | — | — | — | — | 0.33 | 0.5 |

TABLE 4

Ink preparation conditions

| | | | | Ink 38 | Ink 39 | Ink 40 | Ink 41 | Ink 42 | Ink 43 | Ink 44 | Ink 45 | Ink 46 | Ink 47 | Ink 48 | Ink 49 | Ink 50 | Ink 51 | Ink 52 |
|---|---|---|---|---|---|---|---|---|---|---|---|---|---|---|---|---|---|---|
| Pigment (solid content) | | | | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Polyurethane resin microparticle (solid content) | | | | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Surfactant | Formula (1) | F-444 | HLB value: 8.5 | 0 | 0 | 0 | 0 | 1.0 | 1.0 | 1.0 | 1.0 | 1.0 | 1.0 | 1.0 | 1.0 | 1.0 | 1.0 | 1.0 |
| | | S-242 | HLB value: 12.0 | 1.0 | 0 | 0 | 0 | 0 | 0 | 0 | 0 | 0 | 0 | 0 | 0 | 0 | 0 | 0 |
| | | S-243 | HLB value: 15.0 | 0 | 1.0 | 0 | 0 | 0 | 0 | 0 | 0 | 0 | 0 | 0 | 0 | 0 | 0 | 0 |
| | Other than Formula (1) | Ftergent250 | HLB value: 10.4 | 0 | 0 | 1.0 | 0 | 0 | 0 | 0 | 0 | 0 | 0 | 0 | 0 | 0 | 0 | 0 |
| | | AE100 | HLB value: 16.3 | 0 | 0 | 0 | 1.0 | 0 | 0 | 0 | 0 | 0 | 0 | 0 | 0 | 0 | 0 | 0 |
| water-soluble organic solvent | Group A | Glycerin | | 20.0 | 20.0 | 20.0 | 20.0 | 0 | 0 | 0 | 0 | 0 | 0 | 0 | 0 | 0 | 0 | 0 |
| | Other than Group A | 2-Methyl-1,3-propanediol | | 0 | 0 | 0 | 0 | 20.0 | 0 | 0 | 0 | 0 | 0 | 10.0 | 0 | 0 | 5.0 |
| | | Diethylene glycol monobutyl ether | | 0 | 0 | 0 | 0 | 0 | 20.0 | 0 | 0 | 0 | 0 | 0 | 0 | 5.0 | 0 | 0 |
| | | 2-Pyrrolidone | | 0 | 0 | 0 | 0 | 0 | 0 | 20.0 | 0 | 0 | 0 | 0 | 10.0 | 0 | 10.0 | 5.0 |
| | | N-Methyl-2-pyrrolidone | | 0 | 0 | 0 | 0 | 0 | 0 | 0 | 20.0 | 0 | 0 | 0 | 5.0 | 0 | 0 |
| | | Hexylene glycol | | 0 | 0 | 0 | 0 | 0 | 0 | 0 | 0 | 20.0 | 0 | 0 | 0 | 5.0 | 10.0 | 5.0 |
| | | Trimethylol-propane | | 0 | 0 | 0 | 0 | 0 | 0 | 0 | 0 | 0 | 20.0 | 0 | 0 | 5.0 | 0 | 0 |
| | | 1,2-Hexanediol | | 0 | 0 | 0 | 0 | 0 | 0 | 0 | 0 | 0 | 0 | 20.0 | 0 | 0 | 0 | 5.0 |
| Ion-exchanged water | | | | 74.0 | 74.0 | 74.0 | 74.0 | 74.0 | 74.0 | 74.0 | 74.0 | 74.0 | 74.0 | 74.0 | 74.0 | 74.0 | 74.0 | 74.0 |
| Content of self-dispersible pigment/Content of PU resin particle (times) | | | | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Amount of water-soluble organic solvent of GroupA/Amount of water-soluble organic solvent other than Group A (times) | | | | — | — | — | — | 0 | 0 | 0 | 0 | 0 | 0 | 0 | 0 | 0 | 0 | 0 |

TABLE 5

Ink preparation conditions

| | | | | Ink 53 | Ink 54 | Ink 55 | Ink 56 | Ink 57 | Ink 58 | Ink 59 | Ink 60 | Ink 61 | Ink 62 | Ink 63 | Ink 64 | Ink 65 | Ink 66 |
|---|---|---|---|---|---|---|---|---|---|---|---|---|---|---|---|---|---|
| Pigment (solid content) | | | | 4.0 | 4.0 | 4.0 | 4.0 | 4.0 | 4.0 | 4.0 | 4.0 | 4.0 | 4.0 | 4.0 | 4.0 | 4.0 | 4.0 |
| Polyurethane resin microparticle (solid content) | | | | 1.0 | 1.0 | 1.0 | 1.0 | 1.0 | 1.0 | 1.0 | 1.0 | 1.0 | 1.0 | 1.0 | 0.5 | 0.0 | 1.0 |
| Surfactant | Formula (1) | F-444 | HLB value: 8.5 | 0 | 0 | 0 | 0 | 0 | 0 | 0 | 0 | 0 | 0 | 0 | 0 | 1.0 | 1.0 |
| | | S-242 | HLB value: 12.0 | 1.0 | 0 | 0 | 0 | 1.0 | 0 | 0 | 1.0 | 0 | 0 | 0 | 1.0 | 0 | 0 |
| | | S-243 | HLB value: 15.0 | 0 | 1.0 | 0 | 0 | 0 | 1.0 | 0 | 0 | 1.0 | 0 | 0 | 0 | 0 | 0 |
| | Other than Formula (1) | Ftergent250 | HLB value: 10.4 | 0 | 0 | 1.0 | 0 | 0 | 0 | 1.0 | 0 | 0 | 1.0 | 0 | 0 | 0 | 0 |
| | | AE100 | HLB value: 16.3 | 0 | 0 | 0 | 1.0 | 0 | 0 | 0 | 0 | 0 | 0 | 1.0 | 0 | 0 | 0 |

TABLE 5-continued

Ink preparation conditions

| | | | Ink No. | | | | | | | | | | | | |
|---|---|---|---|---|---|---|---|---|---|---|---|---|---|---|---|
| | | | Ink 53 | Ink 54 | Ink 55 | Ink 56 | Ink 57 | Ink 58 | Ink 59 | Ink 60 | Ink 61 | Ink 62 | Ink 63 | Ink 64 | Ink 65 | Ink 66 |
| Water-soluble organic solvent | Group A | Glycerin | 20.0 | 20.0 | 20.0 | 20.0 | 20.0 | 20.0 | 20.0 | 20.0 | 20.0 | 20.0 | 20.0 | 5.0 | 20.0 | 0 |
| | | Diethylene glycol | 0 | 0 | 0 | 0 | 0 | 0 | 0 | 0 | 0 | 0 | 0 | 5.0 | 0 | 0 |
| | | Diglycerol | 0 | 0 | 0 | 0 | 0 | 0 | 0 | 0 | 0 | 0 | 0 | 0 | 0 | 20.0 |
| | Other than Group A | 2-Methyl-1,3-propanediol | 0 | 0 | 0 | 0 | 0 | 0 | 0 | 0 | 0 | 0 | 0 | 10.0 | 0 | 0 |
| Additive | Group B | Tetritol | 7.0 | 0 | 0 | 0 | 0 | 0 | 0 | 0 | 0 | 0 | 0 | 7.0 | 7.0 | 0 |
| | | Pentitol | 0 | 7.0 | 0 | 0 | 0 | 0 | 0 | 0 | 0 | 0 | 0 | 0 | 0 | 0 |
| | | Hexitol | 0 | 0 | 7.0 | 0 | 0 | 0 | 0 | 0 | 0 | 0 | 0 | 0 | 0 | 0 |
| | | Heptitol | 0 | 0 | 0 | 7.0 | 0 | 0 | 0 | 0 | 0 | 0 | 0 | 0 | 0 | 0 |
| | | Octitol | 0 | 0 | 0 | 0 | 7.0 | 0 | 0 | 0 | 0 | 0 | 0 | 0 | 0 | 0 |
| | | Polyethtylene glycol (molecular weight: 20,000) | 0 | 0 | 0 | 0 | 0 | 1.0 | 0 | 0 | 0 | 0 | 0 | 0 | 0 | 0 |
| | Other than Group B | Urea | 0 | 0 | 0 | 0 | 0 | 0 | 7.0 | 0 | 0 | 0 | 0 | 0 | 0 | 0 |
| | | N-Methylmorpholine N-oxide | 0 | 0 | 0 | 0 | 0 | 0 | 0 | 7.0 | 0 | 0 | 0 | 0 | 0 | 0 |
| | | Xanthan gum | 0 | 0 | 0 | 0 | 0 | 0 | 0 | 0 | 0.01 | 0 | 0 | 0 | 0 | 0 |
| | | Sodium alginate | 0 | 0 | 0 | 0 | 0 | 0 | 0 | 0 | 0 | 0.01 | 0 | 0 | 0 | 0 |
| | | Polyvinyl alcohol | 0 | 0 | 0 | 0 | 0 | 0 | 0 | 0 | 0 | 0 | 0.01 | 0 | 0 | 0 |
| Ion-exchanged water | | | 67.0 | 67.0 | 67.0 | 67.0 | 67.0 | 73.0 | 67.0 | 67.0 | 74.0 | 74.0 | 74.0 | 67.5 | 68.0 | 74.0 |
| Content of self-dispersible pigment/Content of PU resin particle (times) | | | 4.0 | 4.0 | 4.0 | 4.0 | 4.0 | 4.0 | 4.0 | 4.0 | 4.0 | 4.0 | 4.0 | 4.0 | — | 4.0 |
| Amount of water-soluble organic solvent of GroupA/Amount of water-soluble organic solvent other than Group A (times) | | | — | — | — | — | — | — | — | — | — | — | — | — | — | — |

[Production of Image Samples]

Image Sample 1 was produced by recording a solid image (recording duty: 100%) of 3×3 cm on a recording medium: OK Prince High Quality (basis weight: 64 g/m$^2$) (manufactured by Oji Paper Co., Ltd.) with the ink jet recording apparatus shown in FIG. 1 loaded with a piezoelectric ink jet head KJ4 (nozzle density: 600 dpi, manufactured by Kyocera Corporation) under the conditions shown in Tables 6 and 7 (type of the ink used, surface temperature of the recording medium at application of an ink, and a tension applied to the recording medium with a tension applying means). Image Sample 2 was prepared by recording three lines with a width of 3 mm and one line with a width of 17 mm (each recording duty: 100%) so as to be parallel to each other on a recording medium: DL9084 (basis weight: 91 g/m$^2$) (manufactured by Mitsubishi Paper Mills Limited.). The recording conditions were a temperature of 25° C., a relative humidity of 55%, an ink ejection frequency of 39 kHz, a recording medium-conveying speed of 100 m/s, and an ink ejection volume of about 13 pL per dot on recording. The symbol "-" shown in the column "Tension applied to recording medium" in each table means that the operation by a tension applying means, i.e., application to a recording medium a specific tension higher than the tension caused by conveying the recording medium, is not performed. In the ink jet recording apparatus, the recording conditions of applying ink droplets of 13 ng per dot to a unit region of 1/600×1/600 inch with a resolution of 600×600 dpi is defined as a recording duty of 100%. The surface temperature of a recording medium on the application of an ink was measured with a non-contact infrared thermometer digital radiation thermometer FT-H20 (manufactured by Keyence Corporation) from a position of 10 cm apart from the surface of the recording medium approximately in the perpendicular direction.

[Evaluation]

In the present invention, in the following evaluation criteria of each evaluation item, AA to B are acceptable levels, and C is an unacceptable level.

<Optical Density of Image>

The optical density of the resulting image sample 1 was measured with a reflection densitometer RD19I (manufactured by Gretag Macbeth AG). The optical density of each image was evaluated by the following evaluation criteria. The evaluation results are shown in Tables 6 and 7.

AA: optical density 1.50 or more,
A: 1.50>optical density 1.45,
B: 1.45>optical density 1.40, and
C: 1.40>optical density.

<Scratch Resistance of Image>

OK Topcoat+ (basis weight: 105 g/m$^2$) (manufactured by Oji Paper Co., Ltd.) was superposed on the image of Image Sample 2 within 3 minutes after the recording, and a weight of 500 g was further placed thereon such that the contact area was 12.6 cm$^2$. A scratch resistance test was performed by scraping the recording medium recorded with Image Sample 2 and OK Topcoat+ once at a relative speed of 10 cm/s such that the contact area of the weight intersects the recorded four lines at right angles. Subsequently, the ink adhered to the OK Topcoat+ in the area of 12.6 cm$^2$ on which the weight was placed was read with a scanner (multifunction printer iR3245F (manufactured by CANON KABUSHIKI KAISHA), 600 dpi, gray-scale, picture mode), and the proportion of the area of which the brightness in 256 tones was lower than 128 (proportion of the ink-adhered area) was calculated. The scratch resistance of each image was evaluated by the following evaluation criteria. The evaluation results are shown in Tables 6 and 7.

AA: proportion of ink-adhered area 1%,
A: 1%<proportion of ink-adhered area 3%,
B: 3%<proportion of ink-adhered area 5%, and
C: 5%<proportion of ink-adhered area

[Evaluation of Ejection Stability]

Each ink was loaded in the yellow ink tank of an ink jet printer PX-205 (manufactured by Seiko Epson Corporation), and image data of yellow ({R, G, B}={255, 255, 0} in RGB 256 tones) was successively printed as an A4 size image on ten sheets at standard print quality to prepare image samples. The resulting image samples were visually investigated to evaluate the ejection stability by the following evaluation criteria. The evaluation results are shown in Tables 6 and 7.

A: no stripe and color unevenness were observed in all ten image sample sheets, and B: a stripe or color unevenness was observed in any of the image sample sheets.

TABLE 6

Ink recording conditions and evaluation results

| Example No. | Ink No. | Pigment content/ Content of PU resin particle (times) | Total content of water-soluble organic solvent of Group/ Total content of water-soluble organic solvent other than Group (times) | Surface temperature of recording medium at application of ink (° C.) | Tension applied to recording medium (N/m) | Optical density of image | Scratch resistance of image | Ejection stability of Ink |
|---|---|---|---|---|---|---|---|---|
| Example 1 | Ink 1 | 4.0 | — | 25 | — | A | A | B |
| Example 2 | Ink 1 | 4.0 | — | 70 | — | AA | AA | B |
| Example 3 | Ink 1 | 4.0 | — | 25 | 20 | AA | AA | B |
| Example 4 | Ink 2 | 4.0 | — | 25 | — | A | A | B |
| Example 5 | Ink 3 | 4.0 | — | 25 | — | A | A | B |
| Example 6 | Ink 4 | 4.0 | — | 25 | — | A | A | B |
| Example 7 | Ink 5 | 4.0 | — | 25 | — | A | A | B |
| Example 8 | Ink 6 | 4.0 | — | 25 | — | A | A | B |
| Example 9 | Ink 7 | 4.0 | — | 25 | — | A | A | B |
| Example 10 | Ink 8 | 4.0 | — | 25 | — | A | A | B |
| Example 11 | Ink 9 | 4.0 | — | 25 | — | A | A | B |
| Example 12 | Ink 10 | 4.0 | — | 25 | — | A | A | B |
| Example 13 | Ink 11 | 4.0 | 3.0 | 25 | — | A | A | B |
| Example 14 | Ink 12 | 4.0 | 3.0 | 25 | — | A | A | B |
| Example 15 | Ink 13 | 4.0 | 3.0 | 25 | — | A | A | B |
| Example 16 | Ink 14 | 4.0 | 3.0 | 25 | — | A | A | B |
| Example 17 | Ink 15 | 4.0 | 3.0 | 25 | — | A | A | B |
| Example 18 | Ink 16 | 4.0 | 2.0 | 25 | — | B | A | B |
| Example 19 | Ink 17 | 4.0 | — | 25 | — | A | A | B |
| Example 20 | Ink 18 | 4.0 | — | 25 | — | B | A | B |
| Example 21 | Ink 19 | 5.0 | — | 25 | — | A | B | B |
| Example 22 | Ink 20 | 5.0 | — | 25 | — | A | B | B |
| Example 23 | Ink 21 | 0.4 | — | 25 | — | B | A | B |
| Example 24 | Ink 22 | 0.5 | — | 25 | — | A | AA | B |
| Example 25 | Ink 23 | 1.0 | — | 25 | — | A | A | B |
| Example 26 | Ink 24 | 1.0 | — | 25 | — | A | B | B |
| Example 27 | Ink 25 | 4.0 | — | 25 | — | A | A | A |
| Example 28 | Ink 26 | 4.0 | — | 25 | — | A | A | A |
| Example 29 | Ink 27 | 4.0 | — | 25 | — | A | A | A |
| Example 30 | Ink 28 | 4.0 | — | 25 | — | A | A | A |
| Example 31 | Ink 29 | 4.0 | — | 25 | — | A | A | A |
| Example 32 | Ink 30 | 4.0 | — | 25 | — | A | A | A |
| Example 33 | Ink 31 | 4.0 | — | 25 | — | B | A | A |
| Example 34 | Ink 32 | 4.0 | — | 25 | — | B | A | A |
| Example 35 | Ink 33 | 4.0 | — | 25 | — | B | A | A |
| Example 36 | Ink 34 | 4.0 | — | 25 | — | B | A | A |
| Example 37 | Ink 35 | 4.0 | — | 25 | — | B | A | A |
| Example 38 | Ink 66 | 4.0 | — | 25 | — | A | A | B |

TABLE 7

Ink recording conditions and evaluation results

| Example No. | Ink No. | Pigment content/ Content of PU resin particle (times) | Total content of water-soluble organic solvent of Group/ Total content of water-soluble organic solvent other than Group (times) | Surface temperature of recording medium at application of ink (° C.) | Tension applied to recording medium (N/m) | Optical density of image | Scratch resistance of image | Ejection stability of Ink |
|---|---|---|---|---|---|---|---|---|
| Comparative Example 1 | Ink 36 | 4.0 | 0.3 | 25 | — | C | A | B |
| Comparative Example 2 | Ink 37 | 4.0 | 0.5 | 25 | — | C | A | B |
| Comparative Example 3 | Ink 38 | 4.0 | — | 25 | — | C | A | B |
| Comparative Example 4 | Ink 39 | 4.0 | — | 25 | — | C | A | B |
| Comparative Example 5 | Ink 40 | 4.0 | — | 25 | — | C | A | B |
| Comparative Example 6 | Ink 41 | 4.0 | — | 25 | — | C | A | B |
| Comparative Example 7 | Ink 42 | 4.0 | 0 | 25 | — | C | A | B |
| Comparative Example 8 | Ink 43 | 4.0 | 0 | 25 | — | C | A | B |
| Comparative Example 9 | Ink 44 | 4.0 | 0 | 25 | — | C | A | B |
| Comparative Example 10 | Ink 45 | 4.0 | 0 | 25 | — | C | A | B |
| Comparative Example 11 | Ink 46 | 4.0 | 0 | 25 | — | C | A | B |
| Comparative Example 12 | Ink 47 | 4.0 | 0 | 25 | — | C | A | B |
| Comparative Example 13 | Ink 48 | 4.0 | 0 | 25 | — | C | A | B |
| Comparative Example 14 | Ink 49 | 4.0 | 0 | 25 | — | C | A | B |
| Comparative Example 15 | Ink 50 | 4.0 | 0 | 25 | — | C | A | B |
| Comparative Example 16 | Ink 51 | 4.0 | 0 | 25 | — | C | A | B |
| Comparative Example 17 | Ink 52 | 4.0 | 0 | 25 | — | C | A | B |
| Comparative Example 18 | Ink 53 | 4.0 | — | 25 | — | C | A | A |
| Comparative Example 19 | Ink 54 | 4.0 | — | 25 | — | C | A | A |
| Comparative Example 20 | Ink 55 | 4.0 | — | 25 | — | C | A | A |
| Comparative Example 21 | Ink 56 | 4.0 | — | 25 | — | C | A | A |
| Comparative Example 22 | Ink 57 | 4.0 | — | 25 | — | C | A | A |
| Comparative Example 23 | Ink 58 | 4.0 | — | 25 | — | C | A | A |
| Comparative Example 24 | Ink 59 | 4.0 | — | 25 | — | C | A | A |
| Comparative Example 25 | Ink 60 | 4.0 | — | 25 | — | C | A | A |
| Comparative Example 26 | Ink 61 | 4.0 | — | 25 | — | C | A | A |
| Comparative Example 27 | Ink 62 | 4.0 | — | 25 | — | C | A | A |
| Comparative Example 28 | Ink 63 | 4.0 | — | 25 | — | C | A | A |
| Comparative Example 29 | Ink 64 | 4.0 | — | 25 | — | C | A | A |
| Comparative Example 30 | Ink 65 | — | — | 25 | — | A | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-218727 filed Oct. 21, 2013 and Japanese Patent Application No. 2013-272033 filed Dec. 27, 2013, which are hereby incorporated by reference herein in their entirety.

What is claimed is:

1. An ink comprising:
a self-dispersible pigment;
a polyurethane polymer particle;
a surfactant;
a water-soluble organic solvent; and
water,
wherein the surfactant includes a fluorinated surfactant having an HLB value of 11 or less determined by a Griffin method and represented by Formula (1):

$$R^1(CR^2R^3)_nCH_2CH_2(OCH_2CH_2)_mOH$$

wherein, $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less;

wherein the water-soluble organic solvent includes at least one water-soluble organic solvent selected from Group A consisting of glycerin, ethylene glycol, diethylene glycol, polyethylene glycol with a weight-average molecular weight of 10,000 or less, 1,3-propanediol, 1,4-butanediol, and diglycerol;

wherein the total content of the water-soluble organic solvents of the Group A in the ink is larger than the total content of water-soluble organic solvents other than the water-soluble organic solvents of Group A in the ink; and wherein the mass ratio of the total content of the water-soluble organic solvents of the Group A to the total content of water-soluble organic solvents other than the water-soluble organic solvents of Group A, based on the total mass of the ink, is 10 or more.

2. The ink according to claim 1 further comprising at least one additive selected from the following Group B consisting of tetritol, pentitol, hexitol, heptitol, octitol, and polyethylene glycols having weight-average molecular weight of more than 10,000 and 100,000 or less.

3. The ink according to claim 1, wherein the mass ratio of the content of the self-dispersible pigment to the content of the polyurethane polymer particle, based on the total mass of the ink, is 0.5 or more and 4.0 or less.

4. An ink cartridge comprising an ink storage portion for storing ink, wherein the ink stored in the ink storage portion is the ink according to claim 1.

5. An image-recording method comprising:
a conveying step of conveying a recording medium; and
an ink-applying step of applying ink to the recording medium,
wherein the ink is the ink according to claim 1.

6. The image-recording method according to claim 5, further comprising a heating step of heating the recording medium provided with the ink subsequently to the ink-applying step such that the surface temperature of the recording medium is 70° C. or more.

7. The image-recording method according to claim 5, wherein the ink is applied to the recording medium with a tension of 20 N/m or more in the ink-applying step.

8. The image-recording method according to claim 5, wherein the conveying speed of the recording medium in the conveying step is 50 m/minute or more.

* * * * *